G. R. WALKER.
DRIVING MECHANISM.
APPLICATION FILED AUG. 4, 1919.
1,420,793.
Patented June 27, 1922.
3 SHEETS—SHEET 1.
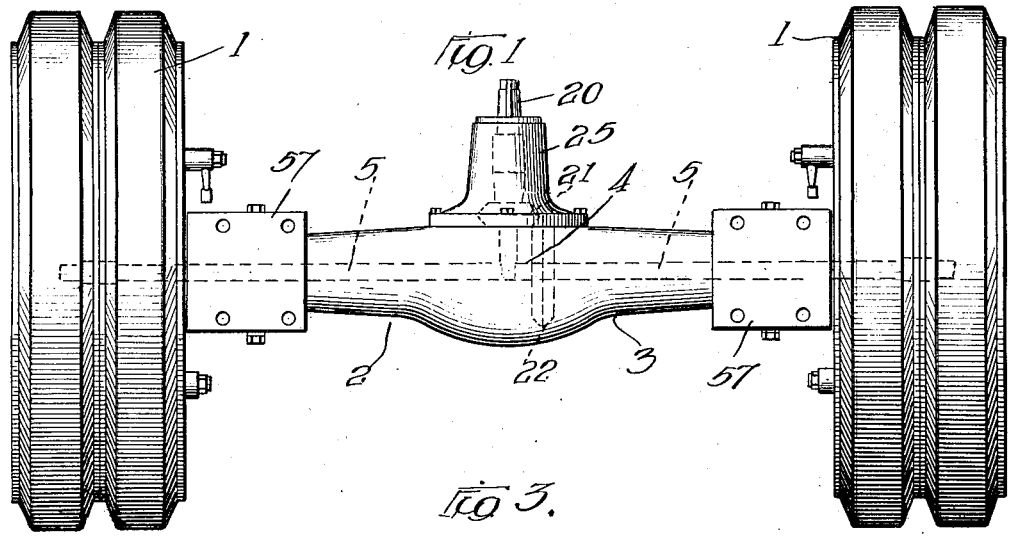
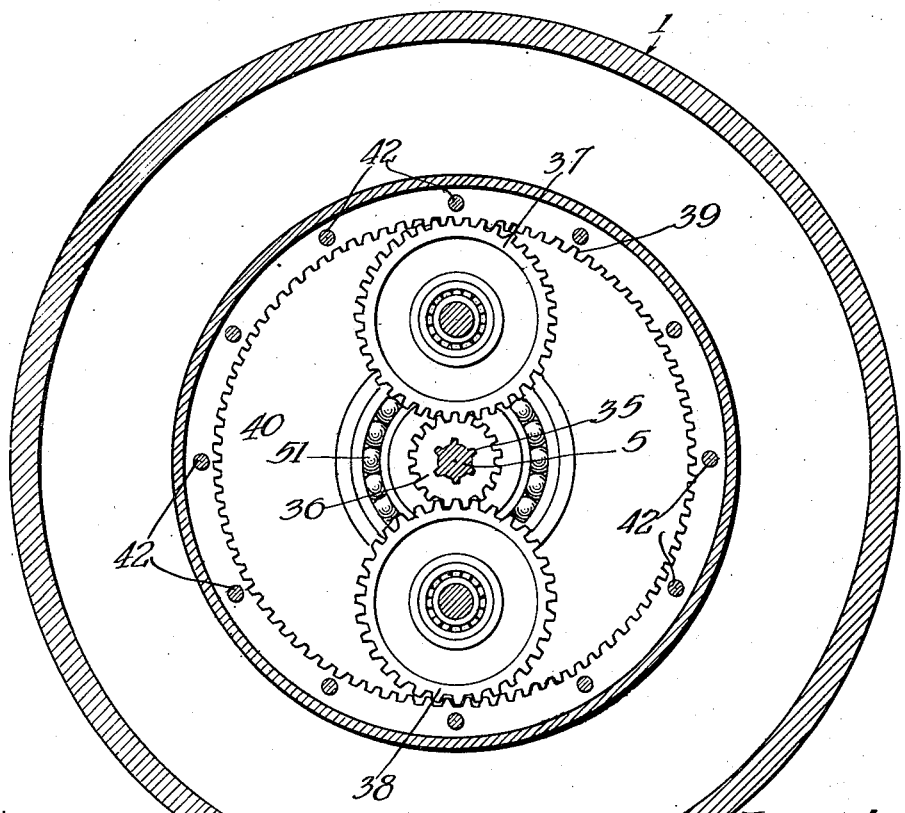

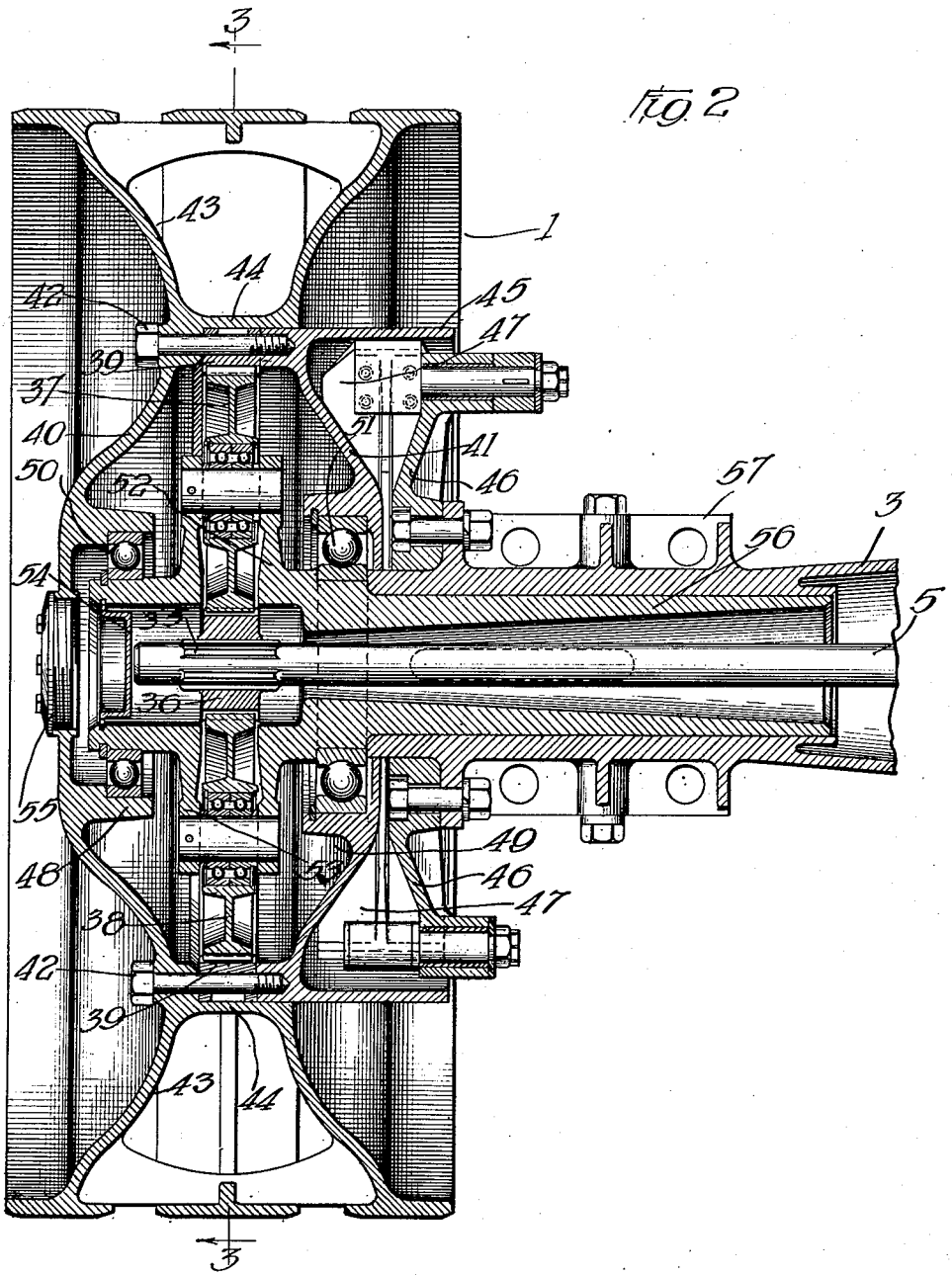

G. R. WALKER.
DRIVING MECHANISM.
APPLICATION FILED AUG. 4, 1919.
1,420,793. Patented June 27, 1922.
3 SHEETS—SHEET 3.
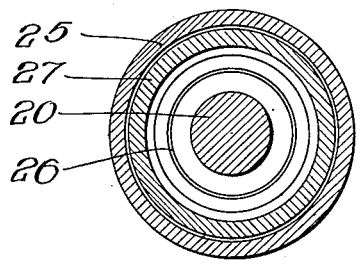
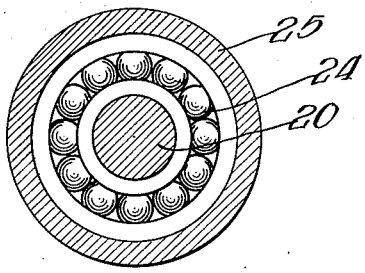
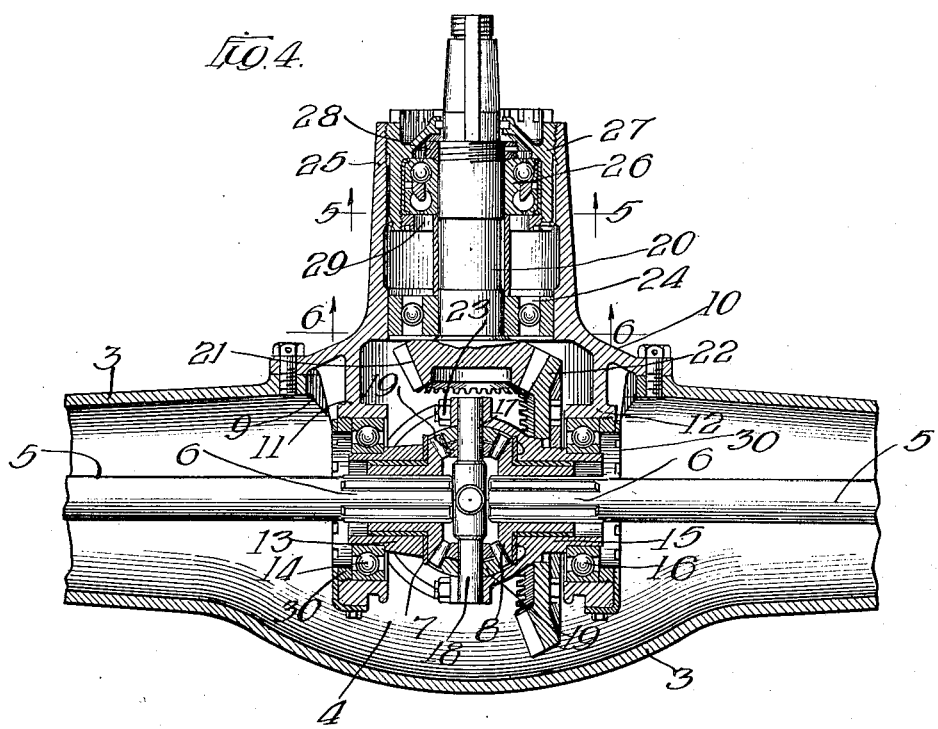

UNITED STATES PATENT OFFICE.

GEORGE R. WALKER, OF CHICAGO, ILLINOIS, ASSIGNOR, BY MESNE ASSIGNMENTS, TO WALKER VEHICLE COMPANY, OF CHICAGO, ILLINOIS, A CORPORATION OF ILLINOIS.

DRIVING MECHANISM.

1,420,793.  Specification of Letters Patent.  Patented June 27, 1922.

Application filed August 4, 1919. Serial No. 315,129.

*To all whom it may concern:*

Be it known that I, GEORGE R. WALKER, a citizen of the United States, residing at Chicago, in the county of Cook and State of Illinois, have invented a certain new and useful Improvement in Driving Mechanisms, of which the following is a full, clear, concise, and exact description, reference being had to the accompanying drawings, forming a part of this specification.

My invention relates to driving mechanisms for motor vehicles and the like, and particularly to that type of driving mechanisms in which drive gearing is associated with each of the traction wheels and the drive is transmitted from a differential to the wheels through their associated gearing.

The inherent advantages of an internal gear drive are well known to those skilled in the art. One of the most eminent of these advantages is the distribution of the driving strain between the differential mechanism and the final drive gearing associated with the traction wheels. This distribution of the driving strain relieves the strain in the differential, making the employment of a smaller differential practical. In driving mechanisms of this type, as heretofore constructed, the traction wheels have been mounted to rotate upon the opposite ends of a fixed or "dead" axle. The drive has been transmitted from the differential through drive axle sections arranged eccentric with respect to the axis of rotation of the driving wheels. Such a construction necessitates external supporting brackets for the eccentrically arranged drive axle sections and as the driving parts and their bearings should be enclosed, an axle casing is necessary in addition to the fixed or "dead" axle upon which the traction wheels are journaled. The complexity of such an arrangement is obvious and the employment of two distinct shafts transversely between the drive wheels of the vehicle is undesirable.

My invention aims to provide a novel, simple and compact driving mechanism, wherein effective operation, durability, ease of assembly, overall efficiency, and other incidental advantages are secured without encountering the disadvantages which have been incidental to the prior art structures of this type.

In accordance with the teachings of my invention, the drive axle sections are arranged co-axial with the axis of rotation of the traction wheels. The drive is transmitted from these drive axle sections to the traction wheels through suitable gearing associated with each wheel. The adjacent ends of the axle sections are connected by a suitable differential and a hollow axle casing encloses the driving parts, i. e., the differential gearing and the drive axle sections and in addition serves as a supporting structure in that the weight of the load may be carried therethrough.

Other aims of my invention not hereinbefore set forth will appear from the following detailed description and the claim, taken with an inspection of the accompanying drawings, in which:

Figure 1 is a plan view of the traction wheels and drive axle of a vehicle embodying my invention;

Fig. 2 is an enlarged axial section through one end of the drive axle and the traction wheel and drive gearing associated therewith;

Figure 3 is a vertical sectional view taken substantially on the line 3—3 of Figure 2;

Figure 4 is an enlarged fragmentary axial section through the central portion of the drive axle and differential gearing;

Figure 5 is a vertical sectional view taken on the line 5—5 of Figure 4; and

Figure 6 is a vertical sectional view taken on the line 6—6 of Figure 4.

Referring to the drawings, 1—1 designate the traction wheels of a motor vehicle and 2 the drive axle thereof. The drive axle 2 comprises a hollow axle casing 3 enclosing a differential gearing 4 and a pair of drive axle sections 5—5. It is to be noted (Figures 1 and 3) that the drive axle sections 5—5, the adjacent ends of which are connected by the differential 4, are arranged co-axial with the axis of rotation of the traction wheels 1—1.

The adjacent ends of the axle sections 5—5 are provided with splines or teeth 6 which slidably engage corresponding grooves provided in the hubs of the two opposed beveled gears 7 and 8 of the differential 4. The hollow axle casing 3 is provided with an opening 9 intermediate its ends and in its forward side as clearly shown in Figure 4. This opening 9 is closed by a cover 10, which cover 10 is provided with integral lugs or supporting brackets 11 and 12 extending into the hollow axle casing 3. The lugs or supporting brackets 11 and 12 are provided with bores co-axial with the axis of the drive axle sections 5—5.

The beveled gear 7 of the differential 4 is journaled in a sleeve 13 which sleeve is in turn journaled in a radial bearing 14 arranged in the bore provided in the lug or supporting bracket 11 extending from the cover 10. The beveled gear 8 is journaled in a sleeve 15 which sleeve is in turn journaled in a radial bearing 16 arranged in the bore provided in the lug or supporting bracket 12. The radial bearings 14 and 16 are retained securely in place by rings 30 adjustably threaded into the supporting lugs 11 and 12 respectively.

The sleeve 15 is provided with integral arms 17 in which arms the opposite ends of a shaft 18 are journaled. The shaft 18, which extends diametrically between the adjacent ends of the drive axle sections 5—5 and opposed beveled gears 7 and 8 carries pinions 19 revolvably mounted thereupon, which pinions 19 mesh with the opposed bevel gears 7 and 8.

The sleeve 15 is driven from a propeller shaft 20 by means of a pinion 21 fixed thereupon, which pinion meshes with a beveled gear 22 secured to the sleeve 15 through the integral arms 17 thereof by means of suitable bolts 23. The inner end of the propeller shaft 20 is journaled in a radial bearing 24 mounted in the hub portion 25 of the cover 10. This propeller shaft is further journaled in a radial bearing 26 arranged in a ring 27 adjustably threaded into the outer open end of the hub 25. The bearing 26 is retained in place between a collar 28, threaded upon the propeller shaft, and a retaining ring 29 threaded into the inner end of the ring 27.

The outer ends of each of the drive axle sections 5—5, which drive axle sections are arranged co-axial with the axis of rotation of the traction wheels 1—1, is longitudinally splined as shown at 35 (Figure 2), these longitudinal splines slidably engaging similar splines provided in the axial bores of the pinions 36. Each pinion 36 meshes with preferably two or more intermediate gears 37 and 38, although one of such intermediate gears will suffice. The intermediate gears 37 and 38 in turn mesh with an internal gear 39 provided within the traction wheel 1. This drive or reduction gearing is generally similar to that shown in my prior Patent Number 866,410, granted September 17, 1907.

The drive, or reduction gearing within the traction wheel is enclosed in a chamber defined by a plate 40 formed integral with the wheel 1 and a co-operating side plate 41 secured thereto by means of suitable bolts 42. The particular contour of the plates 40 and 41 is immaterial. The plate 40, which is attached to the rim of the wheel 1 through a suitable webbed portion 43, provides an annular flange 44 within which and between the plates 40 and 41 the internal driving gear 39 is mounted. A brake drum 45 is formed integral with the side plate 41, suitable brackets 46 carried by the hollow axle casing 3 carrying co-operating brake shoes 47, although a suitable brake band might be employed if so desired.

The plates 40 and 41 of the gear casing provided within the wheel 1 are provided with internally projecting hubs 48 and 49 respectively in the bores of which hubs suitable radial bearings 50 and 51 are arranged. A yoke member 52 is journaled in the radial bearings 50 and 51. This yoke member 52 is provided with suitable radial projecting portions 53 in which radial projecting portions the intermediate gears 37 are mounted. The yoke member 52 is provided with an inwardly extending annular hub portion 56 telescoped into the adjacent open end of the hollow axle casing 3. Rotary motion of the hub portion 56 with respect to the axle casing 3 may be prevented by a suitable splined connection or by means of suitable radial bolts. A spring 54 secured in the outer end of the yoke member 52 bears against the adjacent end of the drive axle section 5. A cap or hub plate 55 is screw threaded axially into the plate 40.

The hollow axle casing 3 is provided with a flat supporting portion 57 adjacent each of the traction wheels 1—1 upon which the frame of the vehicle is mounted either directly or through suitable springs.

It will now be apparent that I have provided a driving mechanism of exceedingly simple and compact construction.

The features of transmitting the drive from a differential through suitable drive axle sections and thence to the traction wheels through suitable gearing associated with each wheel and arranging the drive axle sections co-axial with the axis of rotation of the traction wheels in order that the entire driving mechanism may be embodied in a single drive axle are highly important aspects of my invention.

While I have described my invention in connection with the details of a particular embodiment, I do not intend thereby to limit the invention to such details, as I am aware and contemplate that modifications and changes may be made without departing from the invention which is set out in the appended claim.

I claim:

In combination, a pair of traction wheels provided internally with gears rigidly secured thereto, a continuous hollow axle casing extending between said wheels, a pair of drive shafts arranged within said casing co-axial with the axis of rotation of the traction wheels, a differential arranged between said drive shafts, a gear housing within each traction wheel, the opposite ends of the drive shafts extending into said gear housings and carrying pinions, yoke members at the opposite ends of the hollow axle casing constituting axle supports upon which the traction wheels are journaled, said yoke members having hub portions provided with portions extending radially therefrom and terminating in substantially the same plane short of the gear secured to the wheel, intermediate gears interposed between said pinions and the gears rigidly secured to the wheels, said intermediate gears being mounted through bearing members upon shafts mounted in the radial yoke extensions, said bearing members including inner and outer race members, the radial yoke extensions being formed to cooperate with the inner and to clear the outer race members of said bearings, supporting bearings on the yoke members for the respective wheels, the opposite ends of the hollow axle casing extending through the adjacent walls of the gear housing within the wheels and into cooperation with said wheel supporting bearings to position the same.

In witness whereof I hereunto subscribe my name this 31st day of July, A. D. 1919.

GEORGE R. WALKER.